W. N. BEST.

SAFETY SIGNAL FOR VEHICLES.

APPLICATION FILED DEC. 9, 1916.

Reissued Aug. 20, 1918. 14,505.

William N. Best Inventor

By His Attorneys

Prindle, Wright & Smale

UNITED STATES PATENT OFFICE.

WILLIAM N. BEST, OF BROOKLYN, NEW YORK, ASSIGNOR OF ONE-FOURTH TO CECILIA WUPPER, OF BROOKLYN, NEW YORK, AND ONE-FOURTH TO CLAIR W. FAIRBANK, OF NEW YORK, N. Y.

SAFETY-SIGNAL FOR VEHICLES.

14,505. Specification of Reissued Letters Patent. Reissued Aug. 20, 1918.

Original No. 1,192,264, dated July 25, 1916, Serial No. 49,773, filed September 9, 1915. Application for reissue filed December 9, 1916. Serial No. 136,000.

*To all whom it may concern:*

Be it known that I, WILLIAM N. BEST, a citizen of the United States, residing in the city of New York, borough of Brooklyn, county of Kings, and State of New York, have invented a new and useful Improvement in Safety-Signals for Vehicles, of which the following is a specification.

This invention relates to safety signal devices for automobiles or other vehicles.

The object of my invention is to provide means whereby an occupant of the vehicle may warn those behind, ahead, and at the side, of his intention to turn or stop. A further object is to provide signaling devices provided with light signal means supplied with electricity, gas, etc., and arranged with controlling means such as shields or guards or means to turn on and off the supply of electricity, gas, etc., so as to indicate the movements of the vehicle. Another object is to so arrange the signals that those in diagonally opposite positions are acuated simultaneously. Another object is to direct the rays of such signals both laterally and in the direction of travel, so that they may be seen by persons on side streets. A further object is to provide a signal to indicate when the vehicle is to go slower or to stop.

Figure 1:
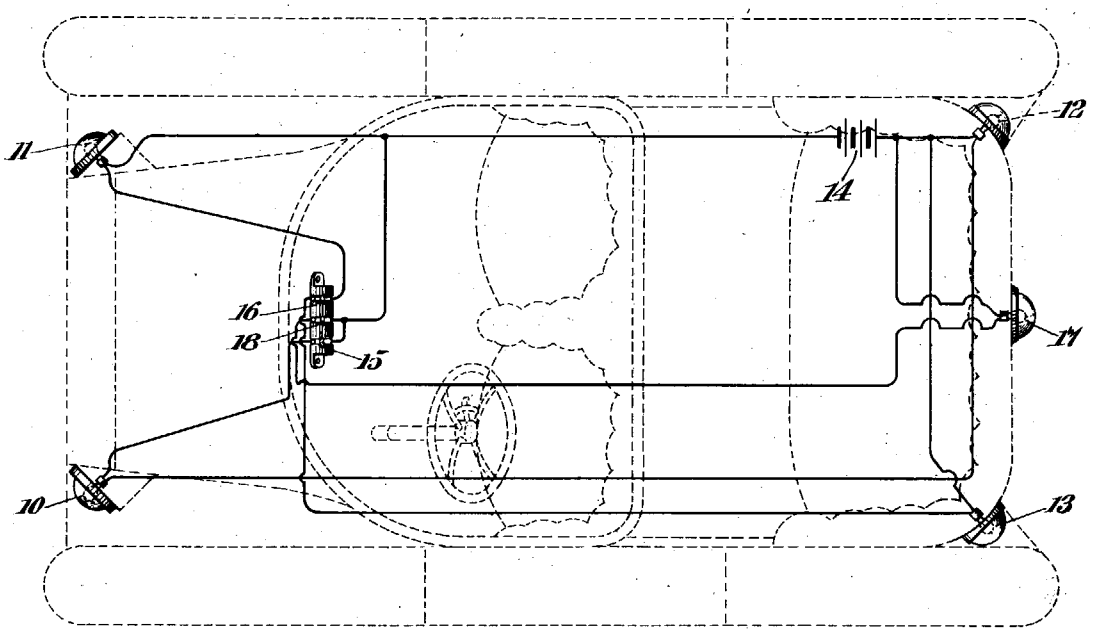
Figure 2:
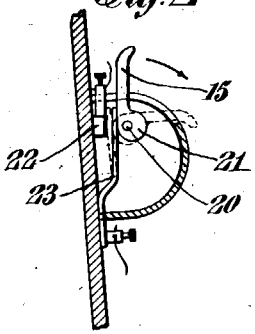

While my invention is capable of embodiment in many different forms, for the purpose of illustration I have only shown one embodiment thereof in the accompanying drawings, in which:

Figure 1 is a diagrammatic plan view of a vehicle equipped with my invention; and Fig. 2 is a transverse section through the controlling switch for the same.

In carrying out my invention, I provide lights 10, 11, 12 and 13 at the four corners of the vehicle, the two lights 10 and 11 being at the front corners and arranged to throw their rays forwardly or laterally. If desired, they may be so constructed as to direct their rays only laterally and not forwardly, but the other arrangement is preferable as it serves to warn approaching vehicles of the intention to turn. The lights 12 and 13 are at the rear corners and direct their rays not only rearwardly but laterally. The lights 10 and 12 which are at diagonally opposite corners of the vehicle, may be connected in the same circuit or may be operated by the same controlling member. As shown, they are arranged in series with the battery 14 or other source of electrical energy, and a controlling switch 15. The lights 11 and 13 at diagonally opposite corners are connected in series in another circuit including the source of electrical energy and a controlling member 16. In addition to these lights, I preferably provide another light 17 which is mounted in the center of the rear of the vehicle and connected to the battery and a controlling member 18. The three controlling members 15, 16 and 18 are arranged closely adjacent each other and either on the steering post, the dashboard, or at any other convenient point. Preferably, the switches 15 and 16 are positioned upon opposite sides of the switch 18 and each toward the same side of the vehicle as the front lamp which it controls. Thus, if the driver desires to turn toward the left, he moves the left-hand switch, while if he desires to turn toward the right, he moves the right-hand switch. When the driver desires to slow down or stop, he operates the center switch to turn on the rear center light 17.

The lights may be of any desired color although they are preferably of a color clearly distinguishable from the ordinary white lights, and the ordinary red tail light. I find that green is a very satisfactory color for all of the lights embodying my invention.

The switches or controlling means may be of various different forms but are preferably such that when any switch is closed it will remain closed until again operated. By this I mean that any form of switch may be employed other than the ordinary form of push-button which breaks the circuit the instant it is released.

I have shown the switches 15, 16 and 18 in the form of levers mounted to swing in parallel vertical planes about a common axis 20 and each having a cam portion 21 for pressing together two leaves or terminals 22 and 23. The levers normally extend upwardly or may be swung down whenever desired, and will remain in lowered position with the circuit closed until again positively raised.

The signaling system which I have described is preferably separated from the ordinary search lights, tail light and side lights employed on most automobiles. I have not illustrated the ordinary lights as they form no portion of my present invention. The lights may be operated from the same source of energy as the usual lights on a car, or may constitute an entirely independent system.

While I have described my invention above in detail, I wish it to be understood that many changes may be made therein without departing from the spirit of my invention.

I claim:—

1. In combination, a plurality of electric lights adapted to be arranged in pairs with one pair in front of the other, adapted to indicate the direction of movement of a vehicle to which the same may be applied, an electric circuit including two of the diagonally opposite lights, another circuit including the other two diagonally opposite lights, and separate circuit controllers for said circuits, each of which is designed to remain indefinitely closed independently of the other after manual operation.

2. In combination, a vehicle, a plurality of electric lights adapted to be arranged in pairs with one pair in front of the other, adapted to indicate the direction of movement of the vehicle to which the same may be applied, an electric circuit including two of the diagonally opposite lights, another circuit including the other two diagonally opposite lights, and separate circuit controllers for said circuits, each of which is designed to remain indefinitely closed independently of the other after manual operation.

3. In combination, a plurality of electric lights adapted to be arranged in pairs with one pair in front of the other, adapted to indicate the direction of movement of a vehicle to which the same may be applied, each of said electric lights being arranged to direct its rays both laterally and in the direction of travel of said vehicle, an electric circuit including two of the diagonally opposite lights, another circuit including the other two diagonally opposite lights, and separate circuit controllers for said circuits, each of which is designed to remain indefinitely closed independently of the other after manual operation.

4. In combination, a vehicle, a plurality of electric lights adapted to be arranged in pairs with one pair in front of the other, adapted to indicate the direction of movement of the vehicle to which the same may be applied, each of said electric lights being arranged to direct its rays both laterally and in the direction of travel of said vehicle, an electric circuit including two of the diagonally opposite lights, another circuit including the other two diagonally opposite lights, and separate circuit controllers for said circuits, each of which is designed to remain indefiniately closed independently of the other after manual operation.

5. The combination with a vehicle, of a plurality of electric lights, one arranged at each corner of the vehicle body and each directing its rays both laterally and in the direction of travel of the vehicle, an electric circuit including the lights at two diagonally opposite corners, a second circuit including the lights at the other two diagonally opposite corners, and separate circuit controllers for said circuits and designed to remain indefinitely in their open or closed position after manual operation.

WILLIAM N. BEST.